Sept. 10, 1974     O. W. BURKE, JR.     3,835,061
HIGH POLYMER LATICES AND METHODS AND MEANS FOR PRODUCING SAME
Original Filed Dec. 18, 1968     7 Sheets-Sheet 1

Sept. 10, 1974     O. W. BURKE, JR.     3,835,061
HIGH POLYMER LATICES AND METHODS AND
MEANS FOR PRODUCING SAME
Original Filed Dec. 16, 1968     7 Sheets-Sheet 6

3,835,061
HIGH POLYMER LATICES AND METHODS AND MEANS FOR PRODUCING SAME Oliver W. Burke, Jr., 506 Intracoastal Drive, Fort Lauderdale, Fla. 33304
Application Dec. 18, 1968, Ser. No. 784,596, now Patent No. 3,644,263, which is a continuation-in-part of applications Ser. No. 621,997, Mar. 7, 1967, now Patent No. 3,503,917, Ser. No. 691,823, Dec. 19, 1967, now abandoned, and Ser. No. 767,790, Oct. 15, 1968, now Patent No. 3,622,127. Divided and this application Sept. 3, 1971, Ser. No. 177,823
Int. Cl. B01d; B01f; B01j 13/00
U.S. Cl. 252—359 A                               14 Claims

ABSTRACT OF THE DISCLOSURE

The preparation of aqueous latices from solvent dispersions of elastomers and other high polymer compositions has presented problems including excessive viscosity during processing and foaming and coagulation, which have produced losses and increased costs. Herein combinations of steps and apparatus are disclosed which reduce or eliminate various of these problems, especially coagulum; enable the preparation of latices of high solids content; enable preparation of high solids content latices of grafted or filler extended or filler-reinforced elastomers; enable preparation of high solids latices of low molecular weight polymer which are then modified to materially increase the molecular weight of the polymer; and enable the preparation of improved stable latices both dilute and of high solids content, which are useful for example for adhesive and film forming purposes. The process in common with that of related copending applications is characterized, inter alia, by the establishment of a flow of steam as a continuous phase into which an emulsion of a cement of the polymer is dispersed as an aerosol of latex droplets in a solvent-vapor continuum, followed by coalescence of the latex droplets and separation of the resulting coalesced liquid phase from the resulting solvent-vapor phase. In one embodiment of the present disclosure an unstable emulsion is prepared employing only a limited quantity of emulsifier, so that the homogenizing thereof produces an emulsion the dispersed phase of which is only temporarily of precursor latex particle size. This unstable emulsion is converted to a stable latex by provisions for dispersing the same as the aerosol before coalescence of over 5% of the dispersed polymer phase of the emulsion into droplets of greater than precursor latex particle size (or for stabilizing the same by the addition of a secondary emulsifier to the same before such condition is reached without further reducing the size of the cement droplets of the dispersed phase), so that the latex in the aerosol and separated therefrom is kept free of coagulum during the coalescing of the latex droplets and the separation and further treatment, e. g. stripping and concentrating, with or without correlated further additions of emulsifier to stabilize the latex for storage or use.

The separation of the gaseous and liquid latex phases is preferably effected with the aid of partially concentrated liquid latex; and in certain embodiments herein disclosed a mixture of such partially concentrated latex commingled with water vapor generated therefrom is added to and commingled with the aerosol before or after at least a part of the aerosol has been coalesced, and the combined liquid phases and combined gas phases of the resulting mixture are thereafter separated. Also in certain embodiments of the invention a liquid flow of secondary emulsifier may be added to the uncoalesced or partially coalesced aerosol, or to the mixture thereof with the partially concentrated latex, prior to the separation of the gaseous and liquid phases thereof.

CROSS REFERENCE TO RELATED APPLICATIONS

This application is a division of our co-pending application Ser. No. 784,596, filed Dec. 18, 1968 (Pat. No. 3,644,263 issued Feb. 22, 1972) which was filed pursuant to a requirement for restriction there, and the disclosure of which is herein incorporated by reference, said application Ser. No. 784,596 having been an improvement over and continuation-in-part of our applications Ser. No. 621,997, filed Mar. 7, 1967 now Patent No. 3,503,917, and Ser. No. 691,823, filed Dec. 19, 1967, and now abandoned, and Ser. No. 767,790, filed Oct. 15, 1968 (Pat. No. 3,622,127), the disclosures of which are herein incorporated by reference.

BACKGROUND OF THE INVENTION

1. Field of the Invention

This invention as a whole relates to the production of high solids content aqueous latices with reduced polymer losses from solvent dispersions of high polymer compositions, and aims generally to provide improved method and apparatus combinations therefor, and new products produced thereby, and certain of its novel apparatus aspects are claimed herein.

2. Description of the Prior Art

To date, in the practical art, synthetic latices of high polymers have been primarily prepared by emulsion polymerization, and such practice has not been applicable to high polymers made by essentially anhydrous catalyst polymerizations. It has been proposed to prepare aqueous latices of high polymers from solvent solutions thereof by processes of the type which comprise the general steps of (1) providing a dispersion or cement of the polymer in a volatile organic solvent for the polymer, (2) adding to such dispersion water and an aqueous emulsifier therefor and emulsifying the same to produce an emulsion, (3) stripping the volatile organic solvent from the said emulsion, and (4) recovering the resulting latex product. However, in the practical art difficulty has been experienced in attempting to render such proposed processes commercially feasible, *inter alia,* in that (1) aqueous emulsification and stripping of solvent dispersions or cements of the high polymer materials, especially when dilute, have yielded latices of only medium solids content at high viscosity which render them commercially impractical; (2) in that the emulsions have tended to foam excessively during stripping; and (3) in that the emulsions have tended to form coagulum by coalescence of the polymer phase as well as by drying out especially on contact with heated surfaces, during the stripping and/or concentrating processes.

SUMMARY OF THE INVENTION

When the molecular weight of a polymer is high, in order to form cements without excessive viscosity, which prevents emulsification of the cement, it is necessary to prepare the cements with low polymer and high solvent content. When these dilute cements are emulsified and then stripped of their high solvent content, the resulting latex contains an excess of emulsifier and its latex particles are very small. The excess of emulsifier is undesirable in many uses, e.g. in the use of the latex for producing latex foam. And when the average particle size of the latex is low, e.g. about 500 A., then the viscosity of the latex rises rapidly with increase in solids content reaching 3,000 centipoises at 40% solids or less. It is usually the desire of the industrial users of polymer latex that the polymer be of high molecular weight, that the solids content be high, i.e. in the range of 50–70% that the viscosity of the latex be low (e.g. not more than 5,000 centipoises for adhesives, and as low as 1,000 centipoises for the production of latex foam products), and that the content of emulsifier be low. In various embodiments of the present invention, singly and in cooperating combinations, provisions are made for attaining certain of the above desiderata, particularly: (1) by providing a method in which the precursor latex particle size of the cement in water emulsions is controlled so as to obtain by an aerosol route latex of such particle size (e.g. in the range of 2,000 to 10,000 A., preferably 3,000 to 5,000 A.) that they can be concentrated to have a solids content of over 50%, preferably over 60%, dry solids basis by weight, with a viscosity of not over 5,000 cps. at the 50% solids level, and preferably not over that figure at the 60% solids level; (2) by providing such control by employing the precursor latex particle size of an unstable cement-in-water emulsion, which emulsion is converted to latex by the aerosol route without allowing it to coalesce to a point at which more than 5% of the dispersed phase is in particles of greater than precursor latex particle size, and producing stabilization of the resulting latex either before, during or subsequent to the aerosol conversion and latex concentrating process.

In a first embodiment of the invention, a latex is prepared from an organic solvent dispersion of a composition of organic solvent soluble or dispersible polymer, the latex particles of which are of such size that the latex when at a concentration of 50% solids, dry basis by weight, has a viscosity no greater than 5,000 cps., and the latex contains and is stabilized by an amount of emulsifier material in the range of 4 to 12 parts per 100 parts of the dispersed phase, by weight. In this embodiment the method comprises:

(a) providing a moving flow of gas comprising steam as an initial continuous phase,
(b) providing a cement consisting of a dispersion of the polymer composition in essentially water-immiscible volatile organic solvent which itself or as an azeotrope with water has a boiling point lower than that of water at atmospheric pressure,
(c) emulsifying together said cement and water in the proportions of 0.5 to 2.5 volumes of water per volume of cement with not less than ¼ and not more than ¾ of the said amount of emulsifier material based on the dry solids content of said cement, by weight, to form an unstable emulsion of temporarily precursor latex particle size,
(d) then, before coalescence of more than 5% of the dispersed phase of said emulsion into greater than precursor latex particle size, dispersing the unstable emulsion of temporarily precursor latex particle size into the flow of steam as the initial continuous phase and subjecting the phases to a decrease of pressure while maintaining the temperature thereof below the limiting temperature for maintaining the temporary stability of the emulsion, thereby vaporizing solvent from the dispersed droplets and forming an aerosol of latex in vapor,
(e) dispersing further emulsifier into said aerosol, to the extent of at least one-fourth said amount of emulsifier material based on the dry solids content of said cement, to stabilize the aerosol dispersed latex, and
(f) separating the stabilized latex from the vapor phase of the aerosol.

In this embodiment following step (f) the latex may be concentrated to a solids content, dry basis, of over 50%, by weight, preferably over 60% by weight, with a viscosity of not over 5,000 cps.

In a second embodiment of the invention, a latex is prepared from an organic solvent dispersion of a composition of organic solvent soluble or dispersible polymer, the latex particles of which are of such size that the latex when at a concentration of 50% solids, dry basis by weight, has a viscosity no greater than 5,000 cps., and the latex contains and is stabilized by an amount of emulsifier material in the range of 4 to 12 parts per 100 parts of the dispersed phase, by weight. In this embodiment the method comprises:

(a) providing a moving flow of gas comprising steam as an initial continuous phase,
(b) providing a cement consisting of a dispersion of the polymer composition in essentially water immiscible volatile organic solvent which itself or as an azeotrope with water has a boiling point lower than that of water at atmospheric pressure,
(c) emulsifying together said cement and water in the proportions of 0.5 to 2.5 volumes of water per volume of cement with not less than ¼ and not more than ¾ of the said amount of emulsifier material based on the dry solids content of said cement, by weight, to form an unstable emulsion of temporarily precursor latex particle size,
(d) then, before coalescence of more than 5% of the dispersed phase of said emulsion into greater than precursor latex particle size, dispersing the unstable emulsion of temporarily precursor latex particle size into the flow of steam as the initial continuous phase and subjecting the phases to a decrease of pressure while maintaining the temperature thereof below the limiting temperature for maintaining the temporary stability of the emulsion, thereby vaporizing solvent from the dispersed droplets and forming an aerosol of latex in vapor,
(e) separating the latex droplets from the vapor phase of the aerosol,
(f) concentrating the latex to a solids content, dry basis, of over 50%, by weight, and
(g) dispersing further emulsifier into said latex, to the extent of at least one-fourth of said amount of emulsifier, after the dispersion of the emulsion in step (d) and before the concentration of the latex beyond 45% solids, dry basis, in step (f).

In variations of this embodiment, the emulsifier material may comprise at least two emulsifiers, one having an aromatic nucleus and the other having an aliphatic nucleus, and in a preferred species of this embodiment a combination is employed in which the solvent is an aromatic solvent, the polymer is an aliphatic polymer, the emulsifier employed in step (e) consists essentially of tially of emulsifier having an aromatic nucleus, and the emulsifier employed in step (e) consists essentially of emulsifier having an aliphatic nucleus. Also in one species of this embodiment step (g) is practiced prior to step (e), and in another species step (g) is practiced after step (e).

In a third embodiment of the invention, a latex is prepared from an organic solvent dispersion of a composition of an organic solvent soluble or dispersible polymer, the latex particles of which are of such size that the latex when at a concentration of 50% solids, dry basis by weight, has a viscosity no greater than 5,000 cps., and the latex contains and is stabilized by an amount of emulsifier materials in the range of 4 to 12 parts per 100 parts of the dispersed phase, by weight. In this embodiment the method comprises:

(a) providing a moving flow of gas comprising steam as an initial continuous phase,
(b) providing a cement consisting of a dispersion of the polymer composition in essentially water immiscible volatile organic solvent which itself or as an azeotrope with water has a boiling point lower than that of water at atmospheric pressure,
(c) emulsifying together said cement and water in the proportions of 0.5 to 2.5 volumes of water per volume of cement with not less than ¼ and not more than ¾ of the said amount of emulsifier material based on the dry solids content of said cement, by weight, to form an unstable emulsion of temporarily precursor latex particle size,
(d) mixing into said unstable emulsion, before coalescence of more than 5% of the dispersed phase of said emulsion into greater than precursor latex particle size, further emulsifier material to the extent of at least one-fourth of said amount of emulsifier material while maintaining essentially unchanged the particle size of the dispersed phase,
(e) dispersing the mixture formed in step (d) into the flow of steam as the initial continuous phase and subjecting the phases to a decrease of pressure while maintaining the temperature thereof below the limiting temperature for stability of the emulsion, thereby vaporizing solvent from the dispersed droplets and forming an aerosol of latex in vapor, and
(f) separating the latex from the vapor phase of the aerosol.

In a fourth embodiment of the invention a latex is prepared, the dispersed phase of which is a composition of an organic solvent soluble or dispersible polymer, the latex particles of which are of such size that the latex, when at a concentration of 50% solids, dry basis by weight, has a viscosity no greater than 5,000 cps., and the latex containing sufficient emulsifier material to stabilize the same. In this embodiment the method comprises:

(a) providing a moving flow of gas comprising steam as an initial continuous phase,
(b) providing a cement consisting of a dispersion of the polymer composition in essentially water immiscible volatile organic solvent which itself or as an azeotrope with water has a boiling point lower than that of water at atmospheric pressure,
(c) forming an unstable emulsion of temporarily precursor latex particle size in two emulsifying steps, in the first of which said cement and water are emulsified with sufficient emulsifier to form an unstable crude emulsion, in which more than 5% of the dispersed phase droplets are of greater than precursor latex particle size, and in the second of which said unstable crude emulsion is reduced to an unstable fine emulsion essentially of temporarily precursor latex particle size having no more than 5% of its dispersed phase of greater than precursor latex particle size,
(d) delivering said unstable fine emulsion, as soon as it is formed in said second emulsifying step, directly into said flow of steam as the initial continuous phase and dispersing the same therein and subjecting the phases to a decrease of pressure while maintaining the temperature thereof below the limiting temperature for maintaining the temporary stability of the emulsion, thereby vaporizing solvent from the dispersed droplets and forming an aerosol of latex in vapor,
(e) separating the latex droplets from the vapor phase of the aerosol, and
(f) concentrating the latex to a solids content dry basis, of over 50% by weight.

In variations of this embodiment the emulsifier employed in step (c) is proportioned so that while only sufficient to yield a temporarily stable emulsion of the cement, it is sufficient to produce a stable latex of the polymer after removal of the solvent from the dispersed cement phase; or the proportion of emulsifier employed in step (c) is sufficient to produce only a temporarily stable latex of the polymer after removal of solvent from the dispersed cement phase, and before coalescence of more than 5% of the dispersed phase of the latex into particles of greater than latex particle size, sufficient additional emulsifier material is dispersed into the latex to stabilize the latex, this step in certain embodiments being practiced after the dispersion of the emulsion in step (d) and before the concentration of the latex beyond 45% solids, dry basis, in step (f), and in other embodiments being practiced by dispersing the additional emulsifier material into the aerosol prepared by step (d) and separating the same from the vapor phase thereof with the latex droplets in step (e).

In its apparatus aspect the invention provides apparatus for removing solvent from an aqueous emulsion of a solvent dispersion of high polymer cement to form an essentially solvent-free, coagulum-free latex, the apparatus comprising, in combination, a conduit having a steam inlet, an emulsion inlet, and an aerosol outlet; means for delivering steam into said steam inlet; means comprising a homogenizer connected to said emulsion inlet to deliver homogenized emulsion thereto for dispersion in the steam flow therein to form an aerosol of latex droplets as a discontinuous phase in a solvent-vapor flow as a continuous phase; and means for withdrawing said phases from said conduit; the homogenizer preferably having its outlet connected directly to the emulsion inlet of the conduit; the homogenizer preferably being an ultrasonic liquid jet generator of the liquid whistle type; the emulsion inlet preferably terminating substantially coaxially in the conduit in spaced relation to the walls thereof, and most preferably in a nozzle arranged substantially coaxially in said conduit, which may be of a preferred streamlined form. In this first apparatus embodiment, the apparatus may further comprise coalescing means for coalescing the fine liquid droplets carried by the gas phase of the aerosol, said coalescing means having aerosol inlet means and liquid and vapor outlet means, the aerosol outlet of said conduit being connected to the aerosol inlet means of said coalescing means; and the vapor outlet means of said coalescing means being connected to the means for withdrawing said aerosol phases from said conduit, and the said coalescing means may comprise a tortuous path phase segregating means, or a centrifugal phase segregating means, or an axial impact phase segregating means.

According to a further embodiment of the invention, apparatus for removing solvent from an aqueous emulsion of a cement which essentially consists of a dispersion of high polymer in organic solvent, to form a latex, comprises, in combination:

(a) an aerosol generator having first and second inlets and an outlet,
(b) means for passing a flow of gas comprising steam as an initial continuous phase into said first inlet,
(c) a source of aqueous emulsion of solvent cement the solvent of which itself or as an aqueous azeotrope has a boiling point lower than that of water, said source being connected to said second inlet to deliver the emulsion of cement to said generator for dispersion into the flow of gas therein.
(d) means, e.g. valve means, for proportioning the flow of steam to said first inlet and the flow of cement emulsion to said second inlet to provide sufficient heat by condensation of steam in said flow to vaporize substantially all the solvent from the liquid phase into the gaseous phase of said flow while adding the condensate formed to said liquid phase.

(e) a separator having an inlet for mixed gas and liquid, an outlet for gas, and a separate liquid latex outlet, (f) a latex concentrator having an inlet connected to said separate liquid latex outlet to receive a flow of latex therefrom, and having an outlet, and comprising means for vaporizing a part of the water content of said latex flow to convert it into a flow of water vapor mixed with more concentrated latex and for delivering the same to said concentrator outlet, (g) commingling means having an outlet and having inlet means and means for connecting its inlet means to the aerosol outlet and to said concentrator outlet for mixing the gas and liquid phases of said aerosol and the water vapor and latex phases of said flow and delivering the resulting mixture of gas and liquid bodies from its outlet, (h) means connecting the outlet of said commingling means to the mixed gas and liquid inlet of said separator, and (i) means connected to the liquid outlet of said separator for withdrawing latex therefrom.

In a preferred species of this embodiment, the means for connecting the outlet of the aerosol generator to the inlet means of said commingling means comprises coalescing means for coalescing the fine liquid droplets carried by the gas phase of the aerosol, said coalescing means having aerosol inlet means and liquid and vapor outlet means, the outlet of said aerosol generator being connected to the aerosol inlet means of said coalescing means, and the liquid and vapor outlet means of said coalescing means being connected to an inlet of said commingling means. In further desirable species of these embodiments the means (h) comprises coalescing means for coalescing the liquid droplets or bodies carried by said flow and the liquid phase from said aerosol, said coalescing means having an inlet means connected to the outlet of said commingling means, and having an outlet means connected to the gas and liquid inlet of said separator.

Turning again to its process aspect, the invention as a whole provides a process for removing solvents from an aqueous emulsion of a cement which is essentially an organic solvent dispersion of high polymer composition to form a latex, which process comprises, in combination, the steps of:

(a) providing a moving flow of gas comprising steam as an initial continuous phase, (b) providing a cement consisting essentially of a dispersion of not more than 40% of the polymer composition in essentially not less than 60% of water immiscible volatile organic solvent which itself, or as an azeotrope with water, has a boiling point lower than that of water, (c) forming from said cement and water and emulsifier material an emulsion of at least temporarily precursor latex particle size, (d) dispersing a flow of said emulsion as a discontinuous phase into said flow of steam as an initial continuous phase, in such proportion that sufficient heat is provided by condensation of steam in said flow to vaporize substantially all the solvent from the liquid phase into the gaseous phase of said flow, to form an aerosol while adding the condensate formed to the discontinuous phase of said aerosol, (e) withdrawing a flow of said aerosol, (f) subjecting the withdrawn flow of said aerosol to a separation of its discontinuous liquid phase from its continuous gaseous phase to form a latex, (g) withdrawing a flow of said latex and subjecting said withdrawn flow of latex to vaporization of a part of its water content to convert said flow into a flow of water vapor mixed with bodies of more concentrated latex, (h) commingling the flow produced by step (g) with the flow withdrawn by step (e) and (i) subjecting the commingled flow produced by step (h) to step (f) for effecting separation of the liquid phase of said water vapor and latex flow from the vapor phase thereof simultaneously with the practice of step (f), and (j) withdrawing a part of the latex formed by said step (f).

And in particular species of this latter process, the combination of steps further comprises subjecting the flow of aerosol withdrawn in step (e) to coalescing stresses to coalesce fine liquid droplets carried by the gaseous phase of the aerosol before subjecting said flow to the commingling of step (h); and/or subjecting the commingled flows produced by step (h) to coalescing stresses to coalesce liquid droplets or bodies carried thereby into larger droplets or bodies before subjecting the same to step (f) in accordance with step (i).

In accomplishing the aforesaid objects, in respective embodiments of the present invention conditions are created combinations of which alleviate the aforesaid problems and render practical the production of desirable aqueous latices from solvent dispersions of polymer compositions. These conditions, *inter alia*, include, severally and in various cooperating combinations in the several species of the invention, respectively:

(1) The use of particular solvents for the polymers which are essentially immiscible with water in liquid phase, and which have boiling points less than the boiling point of water at atmospheric pressure, or which form azeotropes with water which have boiling points less than the boiling point of water at atmospheric pressure, and preferably solvents which have boiling points higher than that of water but which form azeotropes with water that have boiling points lower than that of water, which preferred group comprises especially the aromatic solvents including toluene, the xylenes, ethyl benzene, cumene, etc.

(2) The employment of ultradispersing equipment, in certain embodiments together with a homogenizer, e.g. a homogenizer which forces the aqueous emulsion at a high pressure of 1,000 to 10,000 p.s.i. through a constriction, or a homogenizer which forms an emulsion at an intermediate pressure of about 200 to 400 p.s.i. over the vibrating blade of the ultrasonic emulsator type, or a homogenizer of the high shear colloidal mill type, to reduce the polymer cement material in the presence of the aqueous phase with a limited quantity of emulsifier to the form of an unstable emulsion having its dispersed phase temporarily of precursor latex particle size preferably of sizes producing a latex of relatively narrow particle size distribution, and preferably one of an average size in the upper part of the colloidal size range. The said conditions thus enable a primary quantity of emulsifier to be employed to form the unstable latex of the desired particle size, which is larger than the particle size obtainable when the emulsification and/or homogenization is conducted in the presence of a stabilizing quantity of emulsifier material.

(3) The removal of solvent from tiny droplets of the so formed unstable oil-in-water emulsion by introducing the same, as a discontinuous phase, without allowing it to coalesce to a point at which more than 5% of the dispersed phase is in droplets of greater than precursor latex particle size, into a flow of gas comprising essentially steam as an initial continuous phase, and subjecting the two phases together to a decrease of pressure while maintaining the temperature of both phases within the limited range for stability of the aerosol carried latex phase. Solvent is thus vaporized from the precursor latex sized particles while maintaining their stability, so that substantially all the solvent is vaporized into the gaseous continuous phase which thus becomes a gaseous steam carrying aqueous droplets having one or more latex size polymer particles per droplet, the preferred droplet size range being that of an aerosol of which the dispersed phase may comprise colloidal and larger sized droplets in a steam/solvent vapor continuum. For the purpose of this step the avoidance of coalescence above referred to may be accomplished by dispersing the unstable emulsion into the flow of steam to form the aerosol immediately after the homogenization, and preferably directly therefrom, so that insufficient time elapses for such coalescence to occur. Alternatively, a stabilizing quantity of emulsifier, i.e. a secondary quantity, may be mixed into the unstable emulsion without subjecting the same to conditions which would further reduce the droplet size of the dispersed phase, to improve its stability and render it unnecessary to convert it to the aerosol so quickly. The removal of the solvent from the cement particles, together with the aqueous dilution of the resulting latex particles, in some instances produces latex particles which are sufficiently stable for separation from the gaseous phase and at least partial concentration, i.e. to not over 45% solids content, dry basis. When such condition does not pertain, in accordance with this invention further emulsifier may be added to the dispersed phase of the aerosol by introducing liquid emulsifier or aqueous emulsifier solution into the aerosol as soon as it is formed, and before it is subjected to coalescing and separating of the liquid phase. In either event, it is preferred to add further emulsifier to the latex, preferably before concentration thereof has proceeded beyond 45% solids content, dry basis. If desired further emulsifier may be added to finally stabilize the high solids latex after the concentration thereof has been completed.

(4) The separation of the resulting droplets of latex from the gaseous continuous phase by coalescing and collecting the same while avoiding deleterious agglomeration and foaming, may be practiced in several ways which are quite distinct. One of these procedures employs centrifugal force, which may be a number of times the force of gravity, to aid the coalescence or segregation of the latex without foaming. A particular embodiment of this species subjects both the latex phase and the gaseous phase to centrifugal force under controlled pressure conditions, as in a centrifugal pump delivering from a region of higher pressure to a region of lower pressure. Another procedure passes the two phases turbulently or tortuously through means defining an elongated path to effect the coalescence or segregation into droplets or bodies large enough to be separated from the gaseous phase as hereinafter described. In other procedures such coalescences may be effected at least in part by adding, to the aerosol or partially coalesced aerosol, latex or partially concentrated latex and vapor derived therefrom in effecting such partial concentration, such addition being made either before or after partial coalescence of the liquid phase of the aerosol. The partially coalesced liquid phase from the aerosol and liquid of the added latex are then ready to be separated from the gaseous phase of the aerosol and the vapor, if any, introduced with the latex, to form a latex ready for further concentration. After the coalescence or segregation of the liquid phase in one of these manners, the resulting two phases are passed to a collecting means, preferably of the cyclone separator type, and the gaseous phase is then passed to a condensing system from which noncondensibles are pumped by any suitable vacuum pumping means. Throughout the stripping, coalescing and collecting steps: (a) the temperature of the two phases is maintained within the limited temperature range for stability of the emulsion during the period of treatment, preferably by controlling the initial continuous phase in temperature essentially to not exceed such limiting temperature and in quantity to be sufficient to substantially effect the stripping of the solvent, and by controlling the temperature and quantity of the emulsion being dispersed therein; (b) the delivery of substantially all of the solvent to the gaseous continuous phase can essentially be effected in a single pass by appropriate design of the capacity of the apparatus, but may be achieved in part in a first pass through the stripping apparatus and be completed by an additional pass or passes of the partially stripped material through the same or different equipment, e.g. by a recycle while concentrating, and (c) the flow of gas comprising steam as the initial continuum preferably consists entirely of steam expanded, when it first contacts the emulsion, to sub-atmospheric pressure and to a temperature not detrimental to the latter, where any substantial quantity of solvent is being stripped from the precursor latex sized particles, but, under conditions where it is desired to augment the volume or velocity of the initial continuum, being augmentable by including a minor proportion of non-condensible gas or of the solvent in the said flow of gas, for which purpose a minor proportion of the effluent gas phase from the separator, or of the azeotrope remaining in said gas phase after condensation of unazeotroped water vapor therefrom, may be recycled to constitute a part of the initial continuum, or in particular embodiments, by the introduction of only a part of the steam at the point at which the emulsion is injected, and augmenting the flow and solvent vaporation by the introduction of further steam downstream from the point of emulsion introduction.

(5) The latex delivered by the separator may be recycled and be again passed through the centrifugal segregator or the elongated path segregator either separately or after commingling with the aerosol or partially coalesced aerosol, and in such recycling the latex being recycled may be passed through a heat exchanger to convert it to a flow of latex bodies carried along by water vapor generated from the latex, thus to concentrate the latex by removing water therefrom, when a product of higher solids content is desired. When concentrating stripped latex one may cut off the supply of initial raw emulsion and the steam and supply the external heat to the latex through the walls defining the elongated path, e.g. a plate heat exchanger, to vaporize water from the latex with the aid of reduced pressure and may separate the water vapor and latex in the same vacuum separator. Where it is advantageous to remove solvent and concentrate the latex continuously then separate equipment units may be coupled together, one unit for stripping of the solvent from the raw polymer-solvent emulsion with or without latex recycling, and the other unit for concentrating of the stripped latex. The concentrated latex effluent as a discontinuous phase from the heat exchanger with the evolved water vapor which is at least a part of the continuous phase, may again be separated in the separator, the vapor phase passing to the condensing equipment, and any uncondensables again passing therefrom to the vacuum pumping equipment.

(6) While for economy of equipment it is sometimes preferred to employ the same segregator, with adjustment of appurtenant equipment as above described, for effecting both the stripping and the concentration, the capacity of the segregator may be adjusted to the load to be served, and when it is desired to concentrate the stripped latex without suspending the stripping operation of the equipment, one or more separate or merging elongated paths or the like may be provided for 
this purpose, which may terminate in any desired separator equipment. The desired concentration may be effected in a single pass, or, if desired, in a plurality of recycles through the same or different concentrating paths. When the latex being concentrated is returned to the same segregating, separating, or collecting equipment, it is preferably distributed on the walls of the segregator, separator, or collector in such a way that the droplets or bodies of stripped latex being delivered thereto with the solvent vapor will be impinged on the recycled latex, as it has been found that this procedure tends to minimize the formation of coagulum and foam.

(7) The water recovered in the condensing equipment is distilled water saturated with the stripped solvent, and it is preferred to recycle this recovered water for use in preparing the unstable emulsion of the precursor latex sized particles of solvent solution of the high polymer composition.

(8) Various of the above conditions are common to embodiments of process disclosed in the aforesaid copending applications, and various additional features and combinations of features therein disclosed to be more particularly adapted to cooperate with various of the aforesaid features to effect modification of the physical and/or chemical characteristics of the latex produced and/or to facilitate the operations for producing the same, can be employed in conjunction with the present invention, which (a) enables one to control the precursor latex particle size of the emulsion supplied to be stripped of solvent to facilitate the processing operation and reduce polymer losses while providing a latex concentrated or concentratable to a high solids content, preferably 60 to 68% solids, dry basis, and/or to improve the separation of the gas and liquid phases of the aerosol by adding liquid latex to and commingling it with the aerosol as a part of the coalescing separation before subjecting the resulting mixture of gas and liquid phases to separation.

The objects of the invention, severally and interdependently, are to provide new apparatus features and new combinations of steps, which contribute to produce an improved process and which enable the production of new latices which may contain not only polymers and compounding ingredients such as fillers, but which in preferred embodiments may contain such compounding ingredients, e.g. reinforcing fillers, within the high polymer latex particles. Other objects and advantages of the invention will be apparent from the above general description and the following more particular descriptions of preferred embodiments thereof, which, however, are illustrative but not restrictive of the invention, the scope of which is more particularly pointed out in the appended claims.

By the term "latex" as used herein is meant an aqueous suspension of colloidal polymer particles and emulsifier material and the polymer thereof may be selected from the following types and combinations thereof:

(i) homopolymer,
(ii) interpolymer including block and graft polymer,
(iii) hydrocarbon polymer,
(iv) polar polymer,
(v) cross-linked polymer,
(vi) non-cross-linked polymer,
(vii) polymer composition comprising polymer material selected from (i) through (vi) above and compounding ingredients including reinforcing fillers and/or non-reinforcing fillers.

By the term "colloidal" particle or "colloid" as used herein is meant particles in the size range of 500 A. to 10,000 A. diameter, and by the term upper portion of the colloidal size range is meant particles in the size range of above 2,000 A., preferably 3,000 to 5,000 A. diameter.

BRIEF DESCRIPTION OF THE DRAWING

In the accompanying drawing:

FIG. 1 is a flow sheet or diagram illustrating the sequences of steps and flow of material in typical embodiments of process according to the invention.

FIG. 2 is a diagram of a preferred form of equipment for preparing the emulsion, corresponding to portions 7–13 of FIG. 1, the corresponding elements having the same numerals raised by 100, and respective parts thereof being designated by modifying letters.

FIG. 3 is a similar diagram of a preferred form of device for dispersing the emulsion of solvent/polymer cement into the steam flow, and segregating and separating the latex phase from the vapor phase, and further treating the latex phase, corresponding to portions 14 and following of FIG. 1.

FIG. 4 is a more or less diagrammatic elevation partly cut away of a preferred embodiment of the portion 14 of FIG. 1.

FIG. 5 is a more or less diagrammatic elevation, partly cut away, of a preferred form of separator corresponding to portion 16 of FIG. 1.

FIG. 6 is a more or less diagrammatic horizontal cross-section taken on line VI—VI of FIG. 5.

FIG. 7 is a more or less diagrammatic elevation partly cut away of a preferred arrangement comprising a solvent-cement aqueous emulsion homogenizer delivering its output directly to an aerosol generator, according to the invention.

FIGS. 8 to 11 are diagrammatic flow sheets indicating modes of admixing partially concentrated latex, with or without water vapor evolved therefrom, with the gaseous and liquid phase from the aerosol generator, for aiding in the segregation and separation thereof.

FIGS. 12 to 15 are vertical elevations partly cut away of types of mixer nozzles or in line mixers employable as aerosol generators and/or mixers in the practice of the invention, e.g. in FIGS. 8 to 11.

FIG. 16 is a more or less diagrammatic elevation of another embodiment of the invention.

DESCRIPTION OF PREFERRED EMBODIMENTS

(a) In General

In the preferred embodiments illustrated in FIG. 1, the high polymer (1), e.g. elastomer and/or plastomer material as hereinafter described, is prepared as a high polymer composition (4) for conversion to a cement, as by working in appropriate masticating, comminuting, or attenuating equipment (2), such as a rubber mill, Banbury, comminutor, extruder, or the like. In accordance with the aforesaid applications provision may be made for incorporating one or more known polymer compounding ingredients (3), e.g. rubber reinforcing filler, into the said polymer composition in such a way that the ingredients (3) are thereafter contained within the polymer particles of the latex being formed, for which purpose the said ingredient or ingredients (3) may be worked into the high polymer (1) by working therewith in the masticating equipment (2). By such procedure the said polymer ingredients may become fixed to the compounding ingredient, i.e. the polymer particles can become reinforced by the fillers, and in effect become so intimately attached thereto, or embrasive thereof, as to retain the same when dispersed as a cement. In the case of compounding ingredients desired to be incorpoarted in the latex particles, but not requiring working with the polymer itself, such ingredients (3) may be fed into the cement forming equipment or dissolver (5) independently of the said polymer composition (4), as is also indicated in FIG. 1.

In the cement forming equipment or mixer or dissolver (5) which may also comprise a disperser, the high polymer composition (4) is combined and preferably stirred or otherwise worked with solvent (6) appropriate for the high polymer and for the process, as further described herein, to form a solvent cement (7) of the high polymer composition (4) and of any extraneously added compounding ingredients (3), the adequate dispersion of which in the cement may require vigorous working, which may even be accomplished by the passage of the cement through a suitable dispersing equipment (7a).

The solvent/polymer cement (7) is then combined with emulsifier (8) appropriate for the high polymer and the process, and with water (9) in a coarse emulsion mixing equipment (10) where the ingredients are mixed, preferably with the aid of heat, to form a coarse cement in water emulsion (11), which is then passed one or more times through an ultradispersing equipment (12), preferably of the type hereinafter described, which breaks up the relatively large particles of solvent-cement forming the discontinuous phase in the coarse emulsion (11) into particles of precursor latex size, i.e. which will be of at least temporarily stable latex particle size when relieved of their solvent content, and preferably in the upper portion of the colloidal size range.

As in my aforesaid applications the coarse cement-in-water emulsion (11) may be passed one or more times, usually 6 to 12 times, through one or more so-called ultra-dispersers (12) of the "Moulds" type more fully described hereinafter, in order to accomplish a sufficient reduction of latex particle size. The resulting fine emulsions have rather wide ranges of cement droplet size distribution and adjusted if necessary to an appropriate temperature, as by the cooler 13A, by-pass 13B and/or heater 13C, may be fed by suitable positive displacement, e.g. plunger, pump means 13D, to a homogenizer 13E, preferably of the vibrating blade type or of the resiliently restricted orifice type operating at pressures in the range of 1,000 to 10,000 p.s.i., for reducing the particle size distribution of the fine emulsion. The resulting emulsion 13 of reduced particle size distribution with or without cooling by a cooler 13F is preferably delivered directly to a steam mixer or aerosol generator 14 where it is dispersed into a flow of steam as hereinafter described. As indicated in FIG. 1 the emulsifier material (8) may be formed into an aqueous emulsifier solution (8') with water (9') saturated with solvent or with water (9") from an extraneous source.

The resulting fine cement-in-water emulsion 13, in accordance with preferred embodiments of the present invention is an unstable emulsion of only temporarily precursor latex size particles, and in such preferred embodiments of the present invention is either stabilized as by adding further emulsifier at 8A1 before further treatment or, preferably, is immediately converted into an aerosol, of which the dispersed phase may comprise colloidal and larger sized droplets in a steam/solvent vapor continuum, before agglomoration of over 5% of its polymer-solvent particles into greater than precursor latex particle size, and is therein stripped of its solvent content. In such aerosol form the stripping is accomplished without excessive foaming and while avoiding formation of coagulum, desiderata which cannot be attained when any substantial proportion of solvent is attempted to be removed from an aqueous emulsion of high polymer solvent cement in other than an aerosol condition. As in the aforesaid applications, the formation of the aerosol is preferably accomplished by providing a flow of steam (14a) as an initial continuous phase and introducing the oil-in-water emulsion of at least temporarily precursor latex sized particles (13) as a discontinuous phase into the flow of steam as the initial continuous phase in a mixer or aerosol generator (14), whereby volatile solvent (6) is vaporized to become the continuous phase or the principal part thereof, and a corresponding amount of steam is condensed to supply the heat of vaporization for the solvent and become added as water to the discontinuous phase. As explained in connection with FIGS. 3 and 4, in certain embodiments of the present process a part only of the steam may be supplied at a first station where the emulsion of polymer/solvent solution is introduced, and the remainder of the steam may be introduced at one or more stations downstream from said first station. As the phase transition is accomplished the resulting gaseous and non-gaseous phases are usually in a form resembling an aerosol and the aerosol droplets are then coalesced to form a latex separable from the vapor phase. Even when the emulsion has been prepared with only a limited quantity of emulsifier and has its dispersed phase only temporarily of precursor latex particle size, the latex produced by the phase transition in the aerosol may be sufficiently stable for coalescence or even for concentration. When these conditions do not pertain liquid emulsifier or liquid emulsifier solution may be added to the aerosol produced in the aerosol generator 14, as at 8A2.

The coalescing step may be practiced by passing the gaseous and non-gaseous phases through a coalescing means 15 in the form of a segregator or coalescer while maintaining the temperatures of the flows within the limited range for stability of the latex, and the coalesced droplets, now definitely of greater than aerosol size, are collected in the form of a bulk latex from the gaseous continuous phase. As is more fully described in connection with FIG. 3, in certain embodiments of the present invention, the coalescing is accomplished by subjecting the aerosol, on its way to a reduced pressure separator 16, to the action of centrifugal force for effecting segregation or coalescence of the non-gaseous phase, as by passing the gas and latex phases of the aerosol through a centrifugal pump, and preferably a centrifugal pump having the type of pump rotor, pump chamber and inlet and outlet means illustrated in U.S. Pat. No. 3,324,798. As is also more fully described in connection with FIG. 3, in lieu of the centrifugal segregator, other types may be employed, e.g. a plate-type tortuous path segregator or an axial impact phase segregator. The final separation or collection may be attained by delivering the flows from the segregator (15) into a separator or collector (16), from the lower part of which the latex is drawn, and from an upper part of which the continuous phase is passed to condensing equipment (17) maintained under vacuum, preferably a vacuum of the order of 28 to 29 inches of mercury, by withdrawal of uncondensed gases therefrom by vacuum pumping equipment (18), e.g. a steam jet, and the separator of collector (16) may be of various forms and may even be incorporated with a segregator (15) as is described in said copending application Ser. No. 691,823.

Figure 1:
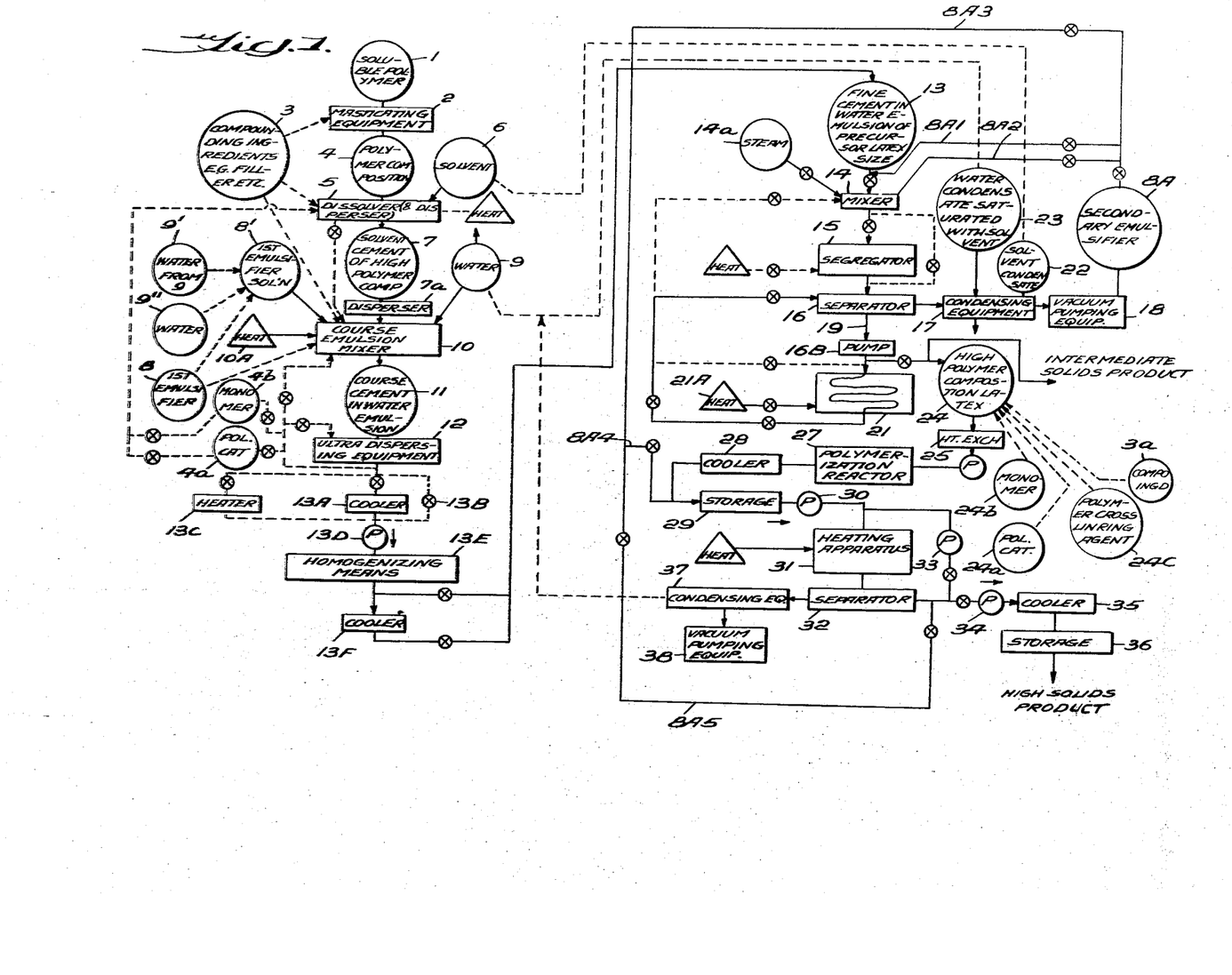

Still referring to FIG. 1, the high polymer composition latex (19) withdrawn from the separator (16) may be delivered as product (20), or may be recycled as indicated at (21) and be again fed as discontinuous phase through the steam disperser (14) and/or the segregator (15) for removal of residual solvent therefrom as above noted, either separately or concurrently with additional emulsion (13) as is indicated by the valve symbols between (13) and (14) and in the lines from (16B) to (14) and in the lines from (16B) to (14) and from (16B) to (16) in FIG. 1; or it may be cycled through a different or the same heater and separator (21 and 16) for concentrating the latex, in which event the latex is heated to evaporate water therefrom under sub-atmospheric pressure at temperatures within the limited temperature range for its stability, by heating fluid passing externally to its flow path (in 21) from the valved heat sources shown connected to (15) and (21), while the supply of steam internally of the path from the valved source (14a) is reduced or cut off as aforesaid. When such concentrating step has been employed, the product (20) resulting therefrom will be a latex of increased solids content.

The present invention, however, makes provisions which may be employed for modifying the latex 20. These provisions are illustrated at 24 and following in FIG. 1 herein. Thus, in these embodiments of the invention, the latex of intermediate solids content may be mixed in a hold tank, mixer, or proportionate feeder 24 with polymerization catalyst 24a and monomer material 24b, and after appropriate adjustment of its temperature, as by a heat exchanger means 25, may be passed to polymerization reactor means 27. The modified polymer latex delivered by the reactor with or without added emulsifier (8A4) may be delivered to storage 29, preferably through a cooler 28, pending delivery as by a pump 30 for further treatment in heating and separating apparatus 31 and 32, which may be of the type shown at 1220 and 1216F in FIG. 3, hereinafter described. In this further treatment residual solvent, odors, and unreacted monomer, if any, may be removed, and if desired the latex may be further concentrated. The modified latex from separator 32, which in each event will have, along with other modifications, a higher solids content than the latex 20, may be passed by a pump 34 to product storage 36, preferably through a cooler 35.

In certain embodiments of the invention, the operations up to point 20 may be conducted to form the cement and latex 20 of low molecular weight polymer, which enables a cement of higher solids content to be employed without having to deal with excessively high viscosity, and monomer 24b and catalyst 24a, and temperature in the apparatus 27 may be employed in such quantities and degree as to materially augment the molecular weight of the polymer, and especially when it is desired to highly augment such molecular weight, polymer cross-linking agent 24c may be added in the mixer 24, for intimate association and reaction in the apparatus 27.

The final stripping, de-odorizing, and/or conentrating in separator 32 is preferably effected as shown with the aid of condensing equipment 37 and vacuum pumping apparatus 38, and when such equipment produces a yield of recoverable fluid, e.g. pure water, such may be returned for reuse, e.g. to the water supply 9, as shown. Where prolonged shelf life is desired, additional emulsifier may be added to the latex from 8A5, preferably ahead of the pump 34.

Figure 3:
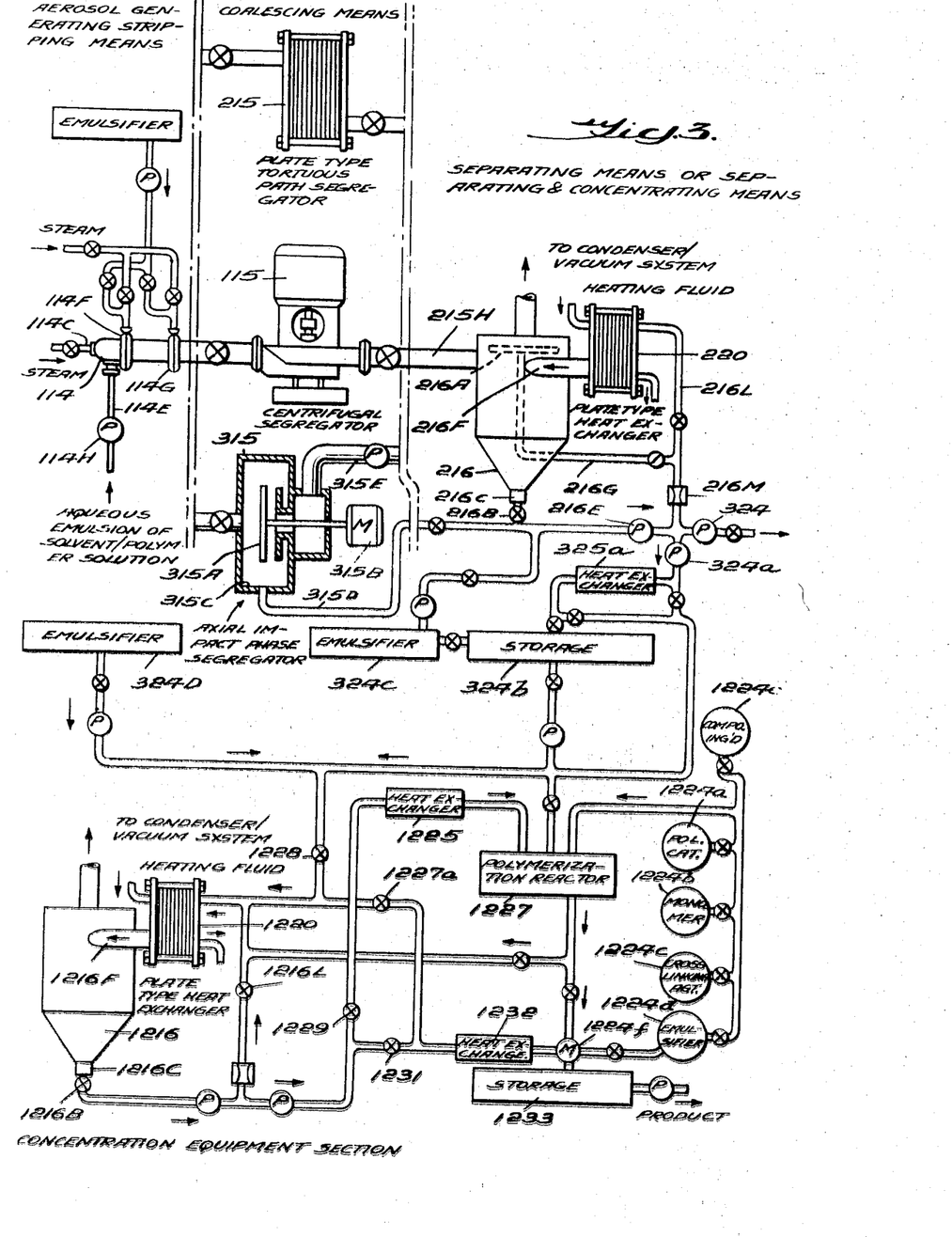

In a still further embodiment of the invention, exemplified in FIG. 3, the stripped latex 324 still containing residual solvent, is subjected to concentration, deodorizing, and stripping of residual solvent in a heating apparatus 1220 and separator 1216, and is then, as a finished high solids latex, subjected to heating to an appropriate temperature at 1225, and further treatment with polymerization catalyst 1224a and monomer material 1224b and/or cross-linking agent 1224c for effecting grafting or cross-linking of the polymer molecules contained in the particles of the finished latex. When necessary after this treatment, the grafted or cross-linked latex may be stripped of residual volatiles and odor, as by passing it through a stripper-deodorizer-concentrator circuit, which may be the same circuit 1220–1216 isolate for this purpose as by opening valves 1227a and 1229 and closing valves 1228 and 1231. Delivery of the treated latex to storage 1233 is preferably effected after cooling in a heat-exchanger 1232, by appropriate adjustment of the valves 1227a–1231.

(b) The Polymer Material (1)

The new process is applicable to the preparation of latices from solvent solutions or dispersions of polymer materials which are essentially solvent soluble or dispersable and essentially water insoluble, including natural rubber and polymers of ethylenically unsaturated monomer material containing from 2 to 20 carbon atoms, preferably from 2 to 10 carbon atoms. It is especially applicable to those elastomers and plastomers which, with or without plasticizers, have the foregoing properties and properties adapting their latices for use as adhesives, binders, film forming materials, coating materials, etc. Examples of such elastomers and plastomers, illustrative but not restrictive of those to which the invention can be applied, are set forth in my aforesaid antecedent application Ser. No. 784,596 (Pat. No. 3,644,263) and are herein incorporated by reference.

(c) Compounding Ingredients (3)(3a), (1223a)

The compounding ingredients which are especially contemplated in the present invention are the solid, particulate, compounding ingredients which are insoluble in the solvents (6), namely: fillers, including rubber reinforcing fillers, pigments, etc., which by the present invention may be incorporated into the polymer composition particles of the latices, rather than merely in the water phases thereof. The solid particulate compounding ingredients of this class comprise those set forth in said antecedent application, and herein incorporated by reference.

(d) The Emulsifiers (8)(8')(8A) etc.

The invention in its broader aspects is not dependent on the use of any particular emulsifier or combination of emulsifiers, and may be practiced with any selected emulsifier or emulsifier combination suitable for aqueously emulsifying and stabilizing the non-aqueous solvent solutions or dispersions of the polymer materials concerned, and/or for stabilizing the latices derived therefrom in the aerosol generator, or for subsequent treatment or conditioning, for which purpose the emulsifier or combination of emulsifiers must be water soluble or water dispersible. Suitable emulsifiers are set forth in said antecedent application (Pat. No. 3,644,263) and are herein incorporated by reference.

(e) Monomer Materials (24b), (1224b)

The ethylenically unsaturated monomer material employable herein is selected from the class set forth in said antecedent application (Pat. No. 3,644,263) and herein incorporated by reference.

(f) Free-Radical Generating Polymerization Catalysts (24a), (1224a)

The free-radical generating catalysts and catalyst systems useful in the range of 0.8 to 20 parts per 100 parts of added monomer materials employed in certain embodiments of the present invention constitute a well-known class which is set forth in my said antecedent application (Patent No. 3,644,263) and is herein incorporated by reference.

(g) Cross-linking Agents (24c), (1224c)

The cross-linking agents useful, in the range of 0.1 to 20 parts per 100 parts of polymer content of the latex by weight, for effecting the cross-linking employed in particular embodiments of the present invention, also form a well-known class of materials which is set forth in my said antecedent application (Pat. No. 3,644,263) and is herein incorporated by reference.

(h) Ionizing Radiation

The ionizing radiation employed in certain embodiments of the present invention is of a type known to those skilled in the art, and set forth in my said antecedent application (Pat. No. 3,644,263) herein incorporated by reference.

(i) Equipment

Homogenizers.—While the invention in its broader aspect is not limited to any particular homogenizer, the invention has disclosed that certain types of homogenizer described in Mould, Jr. Pat. No. 3,195,867* and Hager Pat. No. 3,194,540* as suitable for low viscosity materials such as milk, oil, fruit slurries, etc., can be employed effectively as an ultradisperser of aqueous emulsions of higher viscous solutions of polymer compositions, especially when connected in tandem, and/or for recycle, and in particular that a combination of such "Mould" type homogenizers followed by a resiliently restricted orifice type high pressure homogenizer (1,000 to 10,000 p.s.i.) e.g. of the Gaulin type (see Gaulin patents Nos. 753,792* and 756,953* as available from Manton-Gaulin Mfg. Co., Inc., as model K24–3BS but provided with a 75 horsepower motor, provides an aqueous emulsion of solvent/polymer cement yielding a latex having latex particles of an average diameter near the upper end of the colloidal size range suitable for high solids polymer latices, and of relatively narrow particle size distribution, when processed according to the invention.

Figure 2:
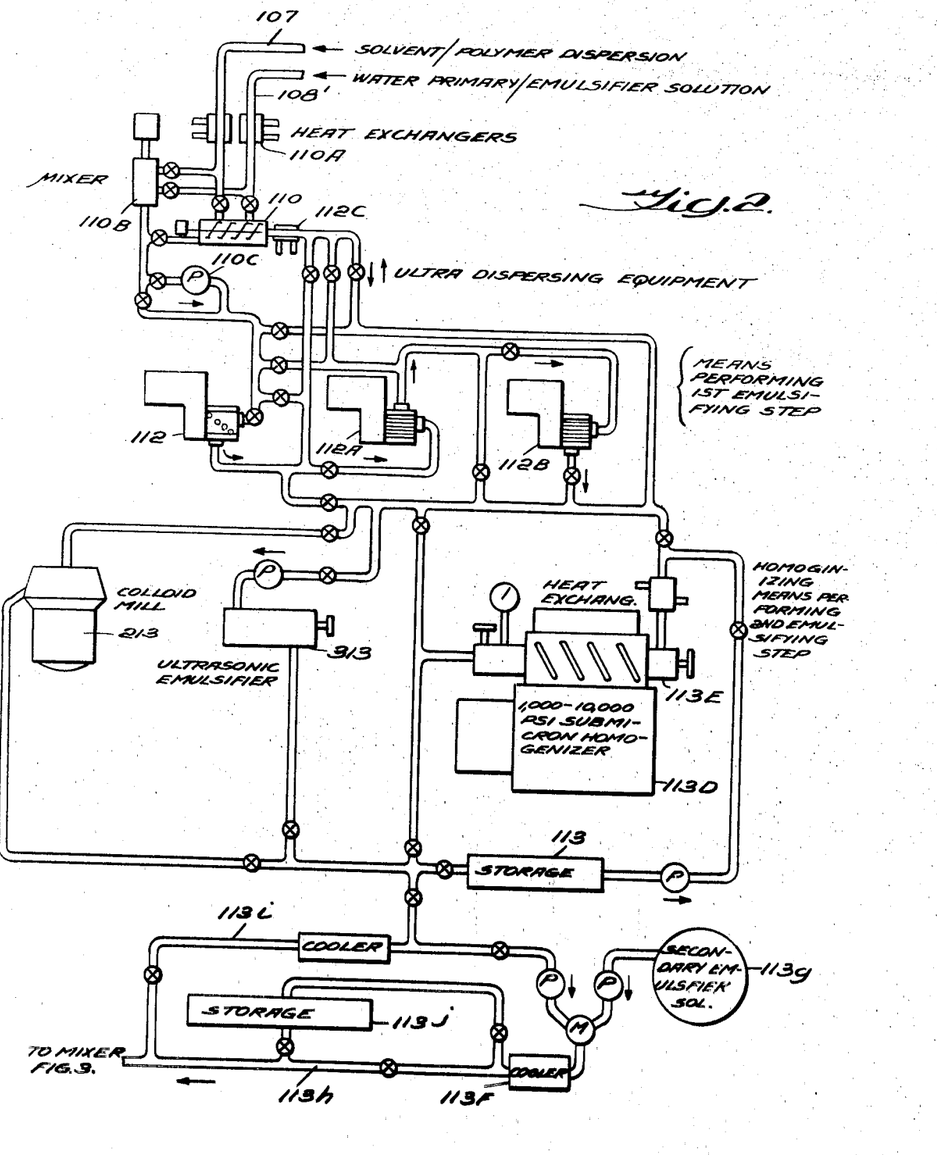

In FIG. 2 there is shown an arrangement of such Mould type and Gaulin type homogenizers to constitute a preferred cement emulsifying equipment. This arrangement is provided with optional facilities selectively employable by means of valves for continuous or batch operation, for single unit or tandem unit operation, and for selective complete or partial recycle in each mode of operation, and it will of course be understood that where certain of these optional facilities are not desired they may be omitted without departing from the invention.

In this FIG. 2 arrangement the solvent and polymer dispersion 107 and the water and emulsifier solution 108' are adjusted in temperature by heat exchangers 110A and passed to the coarse emulsion mixer equipment. For batch operation, as shown, this equipment may be in the form of a hold tank 110 provided with an agitator. For continous operation, as shown, it may be in the form of in-line mixing equipment 110B. The in-line mixer equipment 110B may also be employed to premix the materials being delivered to tank 110 for batch operation. The coarse emulsion in batch operation is passed from tank 110 under gravity head and/or pressure head contributed by pump 110C to the ultradispersing equipment 112 and/or 112A and/or 112B, or for continuous operation may be passed to the latter directly from the in-line mixer equipment 110B, and under the head developed thereby augmented, if desired, by the head developed by pump 110C. The coarse emulsion under pressure as aforesaid may be passed through any one of more of the ultradispersing equipments 112–112B and may be recycled therethrough either directly, or by way of the coarse emulsion tank 110. When the preparation of the emulsion of precursor latex sized particles has been completed this intermediate product may be delivered to storage 113, preferably being cooled by means of a cooler 113F to assure maintenance of the emulsion even with minimum quantities of emulsifying agent present. As is indicated in FIG. 2, effective results have been attained by repeatedly passing the coarse emulsion through an equipment 112 of the perforated stator type shown in Mould, Jr. Pat. No. 3,195,-867, and then through one or more equipments 112A and/or 112B in tandem with, and similar to, equipment 112 but provided with a slotted stator of the type illustrated in FIGS. 5 and 7 of Hager Pat. No. 3,194,540, with recycling from equipment 112A to the tank 110 and then by gravity head through equipments 112 and 112A, about a half dozen to a dozen times before delivery of the resulting product to the storage tank 113. During recycling, especially with sensitive emulsion prepared with a minimum of emulsifying agent, it is desirable to cool the emulsion which has been heated by working in the ultradispersing apparatus, by means of a heat exchanger in the recycle line, as at 112C.

After the emulsion has been reduced to unstable emulsion of precursor latex particle size, when this feature of the invention is employed, a further amount of emulsifier may be combined therewith as shown at 113g is FIG. 2 by simple mixing as in mixer M in the lines leading to 113F, without further homogenizing action that would further reduce the particle size of the dispersed phase. The emulsion of at least temporarily precursor latex particle size in the desired range may be fed, when stable or stabilized, to storage 113 or 113j, or, when only temporarily stable may be fed directly to the mixer or aerosol generator of FIG. 3 via valved line 113h or valved line 113i As is further shown in FIG. 2, various types of homogenizer can be employed for forming the fine emulsion of cement at least temporarily of precursor latex particle size, e.g. a homogenizer of the colloid mill type 213, a homogenizer 313 of the vibrating blade type such as the liquid whistle or "Rapisonic" (trademark) types (presently preferred when used as in FIG. 7), or an emulsifier of the high pressure resiliently restricted orifice type 113D, 113E to which the emulsion effluent from the ultradispersers 112–112B is fed after heating, e.g. to temperatures of 140–160° F. by the heat of 113A. The Gaulin type homogenizer comprises the pump 113D which is a plunger pump that develops from 1,000 to 10,000 p.s.i. depending on the resilient load applied to the valve head means resiliently restricting the emulsifying orifice or valve-opening means of the device. This load can be adjusted in the commercial devices by means of a hand wheel, shown at the entrance end of the homogenizer 113E. The output from the unit 113E may be delivered to cooler 113F and thence to storage 113j, or via 113h or may be stored in tank 113 when recycling through the homogenizer circuit 113D–113F is desired.

Figure 4:
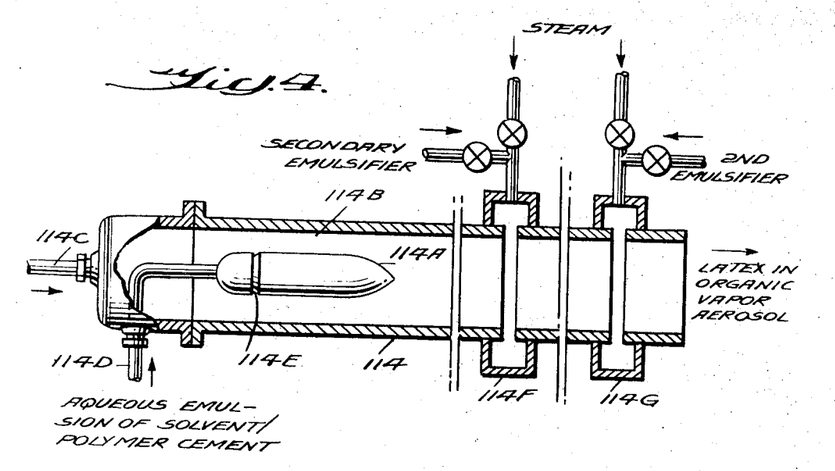
Figures 5, 6:
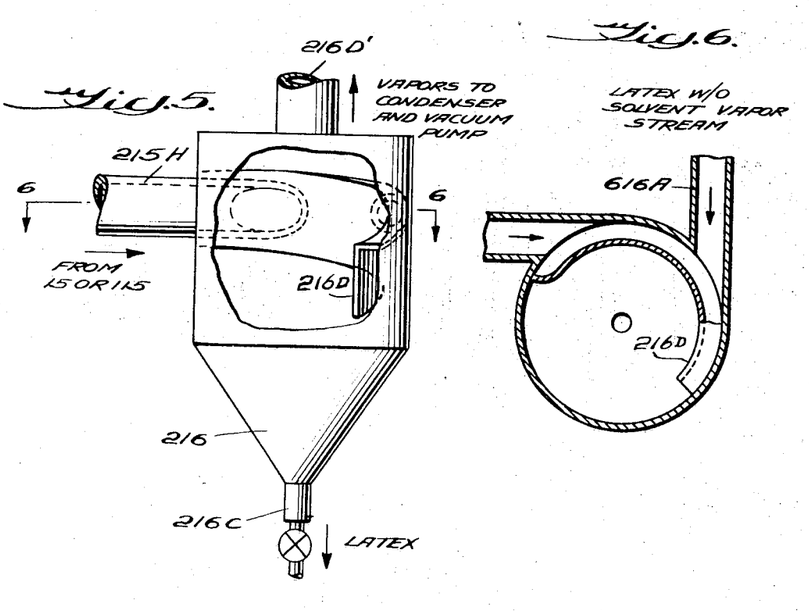

Stripping Mixer.—The stripping mixer 14 (FIG. 1) which disperses the aqueous emulsion of precursor latex sized solvent/polymer droplets into the gaseous stream of steam is preferably of the type illustrated in FIG. 4, consisting of a conduit section 114, which may be transparent, which has supported centrally thereof a torpedo shaped or fid-shaped member 114A for producing a restricted or venturi-effect passage 114B thereabout. The initial continuous phase of steam is admitted as at 114C to flow through the passage 114B and produce an area of high velocity and low static head thereat. The aqueous emulsion of solvent/polymer solution is introduced into the central body 114A as by way of the tube 114D upon which it is supported, and issues into the gas stream via a narrow slot 114E extending peripherally of the body 114A at the region of greatest pressure reduction in the space 114B. Auxiliary steam and/or emulsifier may be introduced at 114F and 114G. As a rule only a very minor proportion of the steam, if any, will be admitted at 114F or 114G, as it is important to have the quantity of steam admitted at 114C sufficient in heat content to vaporize substantially all the solvent from the dispersed phase of the aerosol produced in the space 114B. When this condition is attained, as observed through the transparent conduit section 114 the surfaces bounding the annular and cylindrical passage through the conduit 114 remain free of liquid or solid materials and no foaming can be seen. The aerosol droplets thus attain a size so small that the volume of emulsion therein is too small to form a bubble on vaporization of solvent from the solvent-polymer particles dispersed therein. The fact that the solvent-stripped particles of the aerosol and steam condensate remain in contact with the solvent-vapor phase of course establishes a vapor pressure equilibrium therebetween and the dispersed phase of the aerosol thus contains residual traces of solvent, e.g. of the order of 1% or less, which it is desirable to remove as far as possible with the latex in a dispersed condition rather than a bulky condition prone to foam on evolution of vapors therein. The outlet of the aerosol generating section 114 connects to the vacuum equipment by way of the segregator and collector devices, as exemplified in FIGS. 3 and 5, and the vacuum in the chamber 114 is such that the temperatures attained do not exceed those at which the emulsion and latex are stable. As above noted, the heat for vaporization of the solvent from the solvent/polymer solution is for the most part derived from the condensation of the steam, and the flowing stream of steam and organic vapor carrying the resulting suspended latex droplets is in the nature of an aerosol, exhibits no foaming in the tube 114, and does not ---
*Herein incorporated by reference.

coat or foul the tube 114. As is illustrated in FIG. 3, the aqueous emulsion of solvent/polymer solution is usually supplied to the mixer 114 under pressure, as by a pump 114H.

Coalescing and Separating Means

Separating the latex from the aerosol is effected herein by a combination of coalescing means for coalescing the dispersed latex droplet phase of the aerosol into larger droplets or bodies of latex in the presence of the solvent-vapor gaseous phase, and means for then separating such larger bodies of latex from the solvent-vapor gaseous phase. In the present application and the aforesaid copending applications various forms of coalescing and separating means are disclosed, exemplified herein, e.g., by the delivery of the aerosol from the aerosol generator and stripper 114 (FIG. 3) through coalescing means 115, 215, or 315 to the hereinafter more fully described evacuated cyclone separator means 216, which is preferably internally coated by a sheet of recirculated liquid latex supplied via conduit 216F or conduit 216G and liquid distributor 216A. The coalescing means 215 is a plate type tortuous path segregator which keeps coalescing the liquid phase by impingement, and breaking any bubbles formed therein by impact, as the latex and gas progress down the tortuous path along the pressure gradient to that of the separator 216, and delivers the coalesced bodies of latex and gas to the separator 216. The coalescing means 115 is shown as a centrifugal segregator in which the coalescence is effected by centrifugal force, e.g. a centrifugal pump operating with cavitation and fed with the aerosol, and is representative of similar centrifugal coalescers illustrated in the second and third of my aforesaid copending applications. And the coalescing means 315 is typical of means wherein the aerosol is projected against an impact surface 315A to effect coalescence of the liquid phase impinging thereon when the gaseous phase is deflected thereby, and when the impact surface 315A is arranged coaxially of the aerosol inlet and rotated by a suitable motor 315B, as shown, the coalesced liquid may be centrifugally discharged against the annular surrounding wall 315C and may be withdrawn separately from the gas phase via separate conduits 315D and 315E, respectively, the discharge to the latter being from behind the surface 315A in the form shown. In this latter case, as in the case of FIG. 4 of copending application Ser. No. 691,823, the conduits 315D and 315E may both discharge into the separator 216 either directly or with the liquid delivered by way of the recirculating circuit 216G as shown; or as illustrated in FIG. 16 herein, the separator 216 may even be omitted in some instances, where sufficiently low carryover of latex in the gas via 315E (1115G) enables that conduit to be connected directly to the condenser vacuum system thus converting the unit 315 (1115) into a combined coalescer and separator as shown in FIG. 16.

Separating, Condensing, and Evacuating Apparatus

As will be apparent to those skilled in the art the invention in its broader aspects is not dependent on the use of any particular type of separating, condensing and evacuating apparatus. Conveniently, when stripping azeotroping solvent, in the arrangement of FIGS. 1 and 3 as a separator or collector 16 (216) may be used a vertical cylindrical receiver, with a downwardly tapering bottom leading to a discharge opening connected to a positive displacement pump for removal of separated latex therefrom without breaking the vacuum, with a tangential side opening for passage of the two flows thereinto, and with a top opening for the discharge of the continuous phase to the condensing equipment. The latter conveniently may comprise two condensers, one for non-azeotroped water, and the other operating at a lower temperature for azeotrope of water and solvent. The evacuating apparatus conveniently may comprise a steam jet evacuation equipment connected to draw non-condensed material from the condenser equipment, or a vacuum pump.

In the form shown in FIGS. 3, 5 and 6, the collector 216 generally resembles a cyclone collector into which the gaseous flow and any latex droplets carried thereby are discharged tangentially from the inlet 215H, and guided along the walls by appropriate internal baffling, e.g., the spiralling skirt 216D, so that the liquid collects on the walls and flows to the bottom outlet 216C, while the gas passes to the top outlet by the way of the passage afforded by the central drop tube, or equivalent baffling means, 216D to the condensor/vacuum system. Pump means 216E delivers the latex from the outlet 216C through the outlet valve 216B and, depending on pump and valve setting, wholly or partly via the recycle lines 216G, 216L. Valve 216M can be a pressure opened relief valve for maintaining a delivery pressure at the output of pump 216E while recycling all the latex not delivered by pump 324 or otherwise removed. As before mentioned, the walls of the collector 216 are preferably covered by a flow of latex from a distributor (616A of FIG. 6), which provision facilitates the collection of the latex droplets delivered by the gas stream while minimizing foaming.

As is also shown in FIG. 3, the freshly stripped latex, preferably without removal of its residual solvent, is delivered by pump **324*a* via heat exchanger 325*a* and/or storage hold tank 324*b* to means for modifying the latex which may be used separately or in combination in the arrangement shown. The concentrating circuit 1216–1220 corresponds with the concentrating circuit 31–32 of FIG. 1; and the modifying equipment 1224*a*–1233 provides for delivering the latex from pump 324*a* or storage 324*b* to a polymerization reactor 1227 (either directly or after concentration in the concentration equipment sections 1216–1220 depending on the setting of the valves 1228 and 1229), where it is combined with polymerization catalyst, monomer, cross-linking agent, compounding ingredients and/or emulsifier, from selected ones of sources 1224*a* to 1224*e*** for modifying the size and nature of the latex polymer as described more particularly in my aforesaid copending applications.

The modified latex from the reactor 1227 may be mixed with further emulsifier in mixer **1224*f* and may be passed to storage 1233, with or without first recycling it through the concentration equipment section and/or the polymerization reactor. Where further stabilization is desired emulsifier may be added from 324C or 324D**.

Referring again to FIG. 16, the aerosol generating equipment 1114H, 1114, 1115B (the connection from 1114H to 1114 in FIG. 16 is broken away to indicate provision for insertion of a homogenizer, e.g. in accordance with FIG. 7, between pump 1114H and generator 1114, and to indicate provision for insertion of steam and/or emulsifier injectors as 114F and 114G of FIG. 3 and 4 at the discharge end of aerosol generator 1114) discharges into the bowl 1115A of centrifugal bowl type coalescer-separator 1115 from which the gaseous phase (consisting principally of solvent-vapor) is withdrawn at 1115G to the condenser/vacuum system. The liquid phase separated in the device 1115 is delivered to a standpipe 1115L communicating with the vapor space in 1115, for the most part by way of the scoop offtake 1115E. A pump 1115M controlled by the latex level in standpipe 1115L delivers the latex to outlet 1115N for recycle in part if desired to the input to pump 1114H and/or to the bowl 1115A by way of nozzle 1115K through a squeeze valve 1115P set to maintain a back pressure at 1115N when connected thereto. The latex coalesced and separated in 1115 is in contact with the solvent-vapor phase of the aerosol and therefor contains a trace of solvent due to the vapor pressure equilibrium. Latex of such solvent content is withdrawn through 1115Q and heated below its de-stabilization temperature, in heat exchanger 2115H (preferably a plate package type heat exchanger wherein the latex and steam evolved therefrom pass between paired plates heated by hot water circulated between the pairs). The heated latex and vapor (essentially steam with but the trace of solvent) are then delivered to another evacuated centrifugal separator 2115 similar to 1115, and the latex delivered to its standpipe 2115L is similarly delivered to outlet 2115N for recycle via squeeze valve 2115P for further concentration in 2115H and 2115, and for delivery to product removal 2115Q as by pump 2115R. The latex so delivered is generally essentially free of solvent because of the very low solvent vapor pressure in 2115; however 2115Q may deliver to a further concentrated 2115–2115Q is desired.

Figures 7, 14, 15:
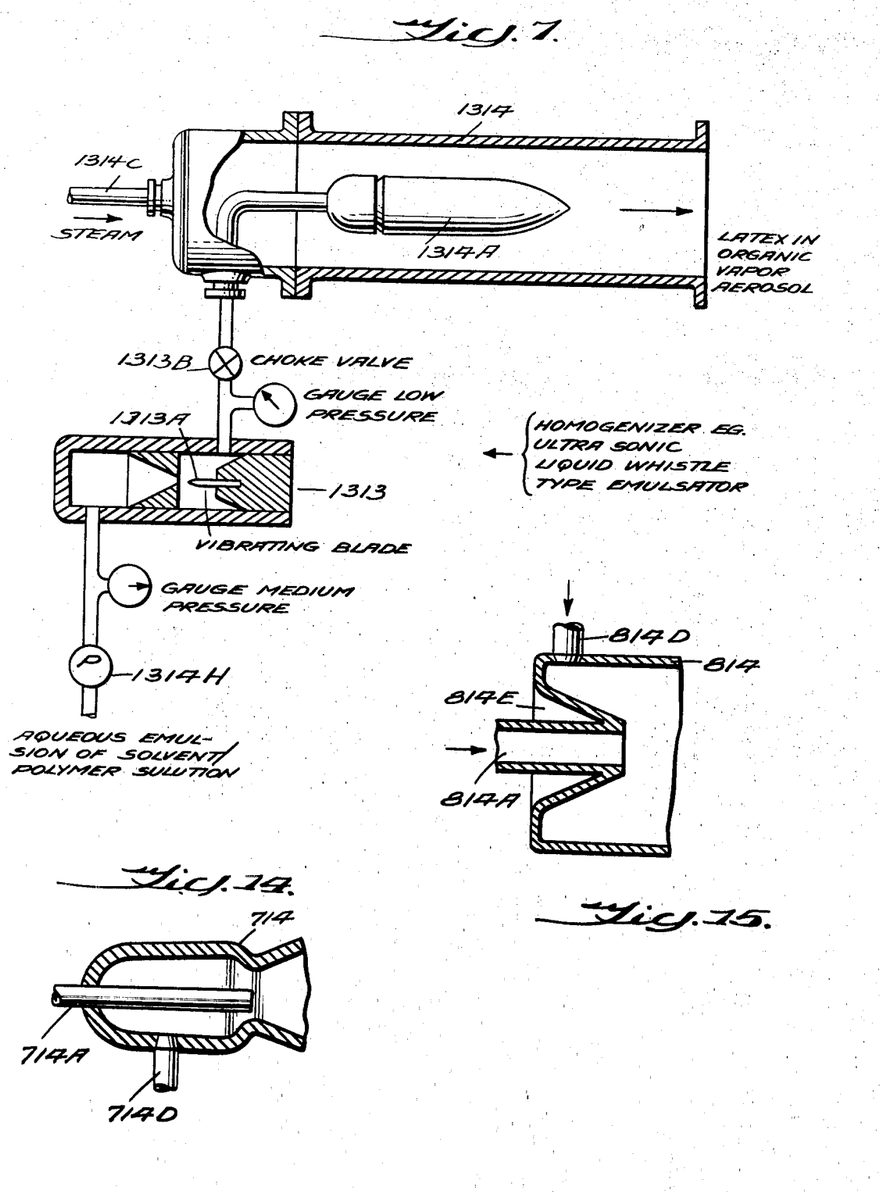
Figure 12:
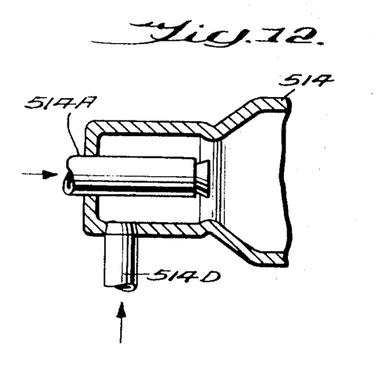
Figure 13:
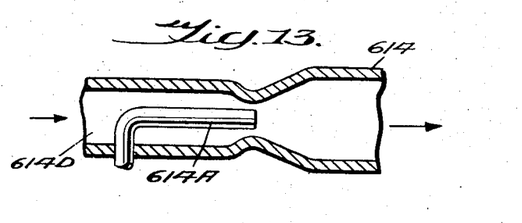
Figure 16:
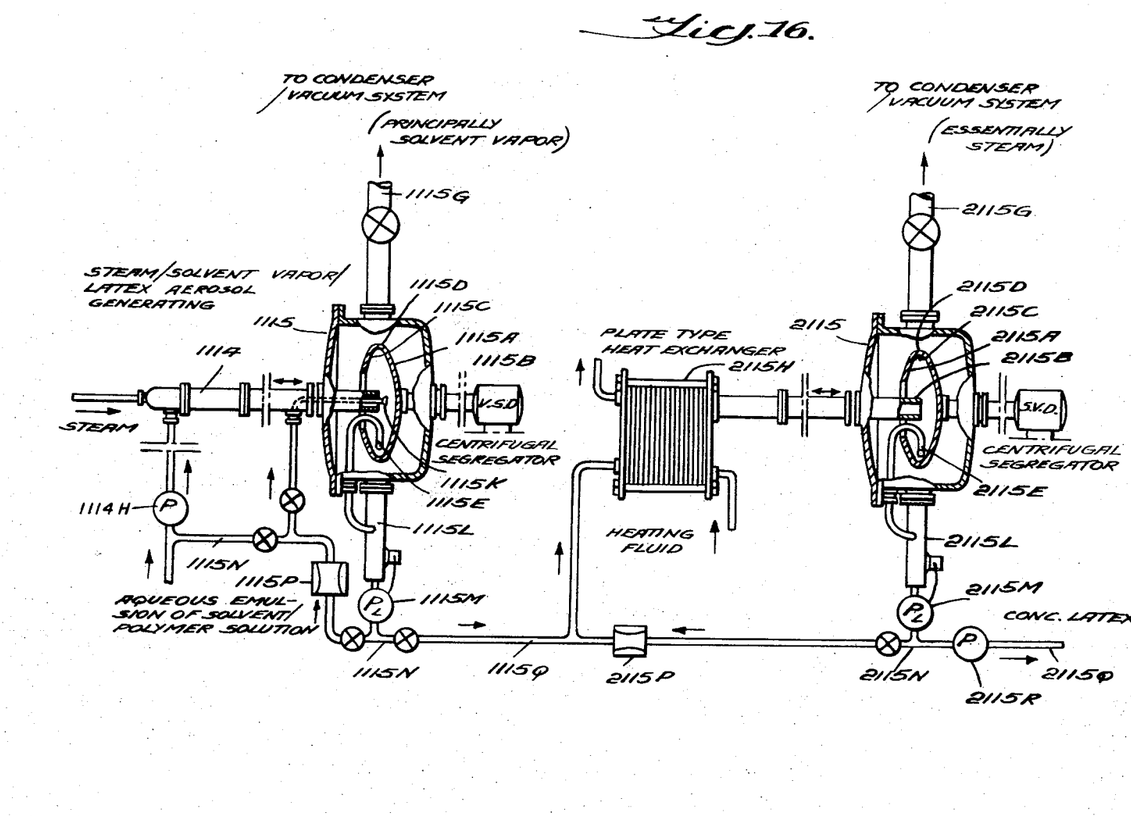

FIG. 7 at 1313 illustrates the direct connection of the solvent polymer emulsion homogenizer 113E, 213, or 313 of FIG. 2 (preferably the vibrating blade type emulsifier 313, FIG. 2) to the aerosol generator 1314 as is particularly desirable when operating with an unstable emulsion in which the solvent-polymer droplets are only temporarily of precursor latex particle size. As is well known to those skilled in the art the vibrating blade homogenizer or "Rapisonic" receives emulsion at medium pressure from a pump 1314H and forms it into a jet which impinges on the edge of a resonantly vibrating blade 1313A and the homogenized emulsion is delivered at a low gauge pressure through a choke valve 1313B. The generator 1314 with streamlined nozzle 1314A is as described in connection with FIG. 4, but may be replaced by other suitable devices, depending on the conditions to be met, particular forms of which are illustrated in FIGS. 12 to 15. In the form of FIG. 12 the conduit 514 is shaped to provide a venturi-like section, and the discontinuous phase is dispersed into the continuous phase (supplied through 514D) by a slotted nozzle 514A located axially of the venturi-like portion of the conduit. In FIG. 13 a similar arrangement 614, 614A, 614D is provided, the nozzle having an axial non-annular discharge at the venturi-area; and the mixer 714 of FIG. 14 is similar but with the supply connections reversed. Finally, the mixer or aerosol generator of FIG. 15 is similar, the latex inlet 814A being air-insulated at 814E from any extended contact with the steam introduced through 814D. While fluid inlets directed tangentially may be employed, substantially linear flow at considerable velocity is preferred at the venturi or mixing areas, especially when the mixers of FIGS. 4, 7, and 12–15 are employed as aerosol generators.

Modifications

In the form of FIG. 3 the gaseous phase and more or less coalesced liquid phase of the aerosol are delivered into the separator 216 constituting the zone of minimum pressure in the system, and are there preferably impinged upon liquid latex recirculated through 216.

In modifications of the invention illustrated in FIGS. 8 through 11, an additional step is employed in that coalescence and separation of the aerosol are aided by combining the stream of aerosol and the stream of concentrated latex and water vapor evolved therefrom in a mixer and intimately commingling the same before introducing them into the separator (zone of minimum pressure).

Referring to FIGS. 8 to 11, in these embodiments as in those above described, there is provided a moving flow 814a of gas essentially comprising steam as an initial continuous phase, and a flow 813a of aqueous emulsion of solvent polymer cement. The cement preferably consists essentially of a dispersion of not more than 40 parts of the polymer composition 4 (FIG. 1) in essentially not less than 60 parts of water immiscible volatile organic solvent which itself, or as an azeotrope with water, has a boiling point lower than that of water. In determining these ratio limits other materials present, e.g. emulsifier, are not included in the calculation. An aerosol generator 814 is provided in which the flow of emulsion 813a is dispersed, as a discontinuous phase, in the flow 814a in such proportions that sufficient heat is supplied by the steam flow 814a to vaporize substantially all the solvent from the liquid phase into the gaseous phase of the flow in 814, to form an aerosol therein while adding the condensate formed therein to the discontinuous phase of the aerosol. The flow of aerosol is withdrawn from the generator 814, and in accordance with these modifications, is subjected, in the combination hereinafter described, to a separation of its liquid discontinuous phase from its continuous gaseous phase to form a latex by passing it into a suitable separator 816. A flow of the latex is withdrawn from the separator 816 and this flow is mixed with the flow of aerosol withdrawn from the generator 814 in a commingling means as shown as mixer 821 of any suitable construction (e.g. the form of any of FIGS. 12 to 15 may be employed) to produce the combination in which the aerosol is subjected to separation in the separator 816, so that the admixture of the flow withdrawn from 816 with the flow of aerosol before its introduction into the separator 816 may assist in the coalescence and separation of the liquid and gaseous phases. A part of the latex separated in the separator 816 is withdrawn as output, as by pump means 822.

In practicing these modifications, further improvements may be obtained by converting to a flow of water vapor mixed with bodies of more concentrated latex the withdrawn stream of latex passing from the separator 816 to the mixer 821, as by passing it through a water vaporizer 820 which may be of the plate type described above (see 220 and 1220 FIG. 3). In this modification the bodies of more concentrated latex mixed with the aerosol in mixer 821 aid in coalescing the discontinuous phase thereof in said mixer, and the water vapor from 820 dilutes the solvent-vapor content of the aerosol and alters the partial pressures to the advantage of the latex.

Figures 8, 9:
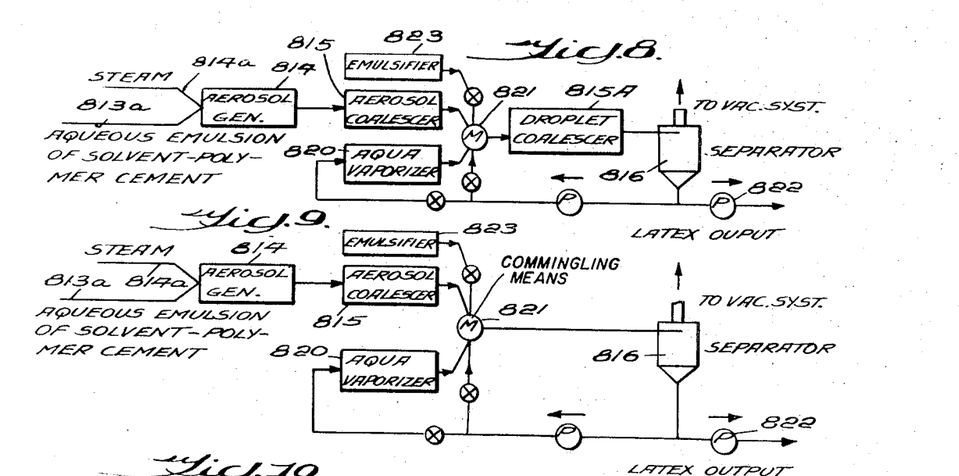
Figures 10, 11:
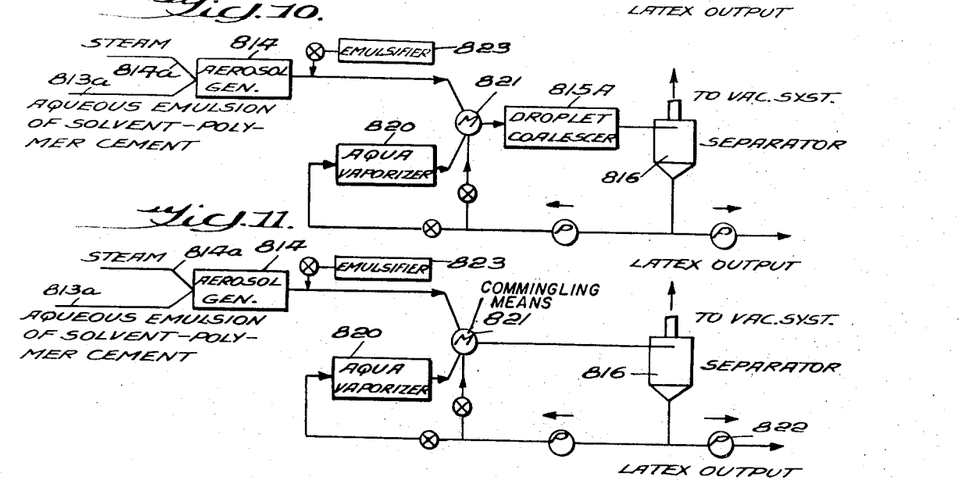

As shown in FIGS. 8, 9 and 10, the aerosol from generator 814 may be subjected to coalescing stresses as by passing it through a coalescing means 815, similar to those above described, prior to its introduction to the mixer 821; or the mixed flow of latex and vapor produced by the mixer 821 may be subjected to coalescing stresses as by passing it through a coalescing means 815A, similar to those above described; or both of these provisions may be included. For simplicity, the use of coalescers 815 and 815A of the plate type tortuous path segregator form above described (215, FIG. 3) is preferred.

Especially when these modifications are carried out using an aqueous emulsion of solvent-polymer cement 813a which is unstable and has its dispersed phase only temporarily of precursor latex particle size, it is advantageous to add further emulsifier 823 to the fluids being mixed in 821. Such addition may be effected by adding the emulsifier at the mixer or to at least one of the flows of fluid passing thereto, as shown.

As specific illustration of the practice of the invention as a whole by the procedures and with the apparatus above described reference may be had to the examples set forth in said antecedent application (Patent No. 3,644,263) herein incorporated by reference, which are illustrative but not restrictive, of the invention.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. Apparatus for removing solvent from an aqueous emulsion of a solvent dispersion of high polymer cement to form a solvent free latex essentially free of coagulum, said apparatus comprising, in combination:

(a) a conduit having first and second inlets and an outlet,

(b) means for passing a flow of gas comprising steam as an initial continuous phase into said first inlet, (c) a source of aqueous emulsion of solvent cement the solvent of which itself or as an azeotrope has a boiling point lower than that of water, in which emulsion a part of the solvent cement may be in droplets of greater than precursor latex particle size, (d) means for subdividing the solvent cement droplets in the aqueous emulsion to precursor latex particle size, said subdividing means having an inlet and an outlet, said source being connected to the inlet of said subdividing means for delivering said emulsion thereto, to have its dispersed phase substantially entirely converted to latex droplets of precursor latex particle size therein, and the outlet of said subdividing means being connected directly to said second inlet to deliver the solvent cement aqueous emulsion of precursor latex particle size directly to said conduit for dispersion into the flow of gas therein to form an aerosol, and (e) means for proportioning the flow of steam to said first inlet to the flow of cement emulsion of precursor latex particle size to said second inlet so as to provide sufficient heat by condensation of steam in said flow to vaporize substantially all the solvent from the liquid phase into the gaseous phase of said flow while adding the condensate formed to said liquid phase.

2. Apparatus for removing solvent from an aqueous emulsion of a solvent dispersion of high polymer cement to form an essentially solvent-free, coagulum-free latex, said apparatus comprising, in combination, a conduit having a steam inlet, an emulsion inlet, and an aerosol outlet; means for delivering steam into said steam inlet; means capable of subdividing the cement dispersion in the aqueous emulsion to precursor latex particle size, said subdividing means being connected to said emulsion inlet for delivering the so subdivided emulsion to said inlet for dispersion in the steam flow in said conduit to form an aerosol of latex therein as a discontinuous phase in a solvent-vapor flow as a continuous phase; and means for withdrawing said phases from said conduit.

3. Apparatus as claimed in claim 2, wherein said subdividing means is an ultrasonic liquid jet generator of the liquid whistle type.

4. Apparatus as claimed in claim 2, wherein said emulsion inlet terminates substantially co-axially in said conduit in spaced relation to the walls thereof.

5. Apparatus as claimed in claim 4, wherein said emulsion inlet comprises a nozzle arranged substantially coaxially in said conduit.

6. Apparatus as claimed in claim 4, in which a streamlined body is arranged to extend axially within said conduit in spaced relation to the walls thereof, and in which said streamlined body is provided with port means arranged symmetrically about its outer periphery, and in which said emulsion inlet is connected through said streamlined body to said port means.

7. Apparatus as claimed in claim 2, further comprising coalescing means for coalescing the fine liquid droplets carried by the gas phase of the aerosol, said coalescing means having aerosol inlet means and liquid and vapor outlet means, the aerosol outlet of said conduit being connected to the aerosol inlet means of said coalescing means; and the vapor outlet means of said coalescing means being connected to the means for withdrawing said aerosol phases from said conduit.

8. Apparatus as claimed in claim 7, said coalescing means comprising a tortuous path phase segregating means.

9. Apparatus as claimed in claim 7, said coalescing means comprising a centrifugal phase segregating means.

10. Apparatus as claimed in claim 7, said coalescing means comprising an axial impact phase segregating means.

11. Apparatus for removing solvent from an aqueous emulsion of a cement which essentially consists of a dispersion of high polymer in organic solvent to form a latex, said apparatus comprising, in combination:

(a) an aerosol generator having first and second inlets and an aerosol outlet, (b) means for passing a flow of gas comprising steam as an initial continuous phase into said first inlet, (c) a source of aqueous emulsion of solvent cement the solvent of which itself or as an aqueous azeotrope has a boiling point lower than that of water, said source being connected to said second inlet to deliver the emulsion of cement to said generator for dispersion into the flow of gas therein, (d) valve means for proportioning the flow of steam to said first inlet and the flow of cement emulsion to said second inlet to provide sufficient heat by condensation of steam in said flow to vaporize substantially all the solvent from the liquid phase into the gaseous phase of said flow while adding the condensate formed to said liquid phase, (e) a separator having an inlet for mixed gas and liquid, an outlet for gas, and a separate liquid latex outlet, (f) a latex concentrator having an inlet connected to said separate liquid latex outlet to receive a flow of latex therefrom, and having an outlet, and comprising means for vaporizing a part of the water content of said latex flow to convert it into a flow of water vapor mixed with more concentrated latex and for delivering the same to said concentrator outlet, (g) commingling means having an outlet and having inlet means and means for connecting its inlet means to the aerosol outlet and to said concentrator outlet or mixing the gas and liquid phases of said aerosol and the water vapor and latex phases of said last named flow and delivering the resulting mixture of gas and liquid bodies from its outlet, (h) means connecting the outlet of said commingling means to the inlet of said separator, and (i) means connected to the liquid outlet of said separator for withdrawing latex therefrom.

12. Apparatus as claimed in claim 11, wherein the means for connecting the outlet of the aerosol generator to the inlet means of said commingling means comprises coalescing means for coalescing the fine liquid droplets carried by the gas phase of the aerosol, said coalescing means having aerosol inlet means and liquid and vapor outlet means, the outlet of said aerosol generator being connected to the aerosol inlet means of said coalescing means, and the liquid and vapor outlet means of said coalescing means being connected to an inlet of said commingling means.

13. Apparatus as claimed in claim 11 wherein the means (h) comprises coalescing means for coalescing the liquid bodies carried by said flow and the liquid phase from said aerosol, said coalescing means having an inlet means connected to the outlet of said commingling means, and having an outlet means connected to the mixed gas and liquid inlet of said separator.

14. Apparatus as claimed in claim 13, wherein the means for connecting the outlet of the aerosol generator to the inlet means of said commingling means comprises coalescing means for coalescing the fine liquid droplets carried by the gas phase of the aerosol, said coalescing means having aerosol inlet means and liquid and vapor outlet means, the outlet of said aerosol generator being connected to the aerosol inlet means of said coalescing means, and the liquid and vapor outlet means of said coalescing means being connected to an inlet of said commingling means.

(References on following page)

References Cited

UNITED STATES PATENTS

| | | | |
|---|---|---|---|
| 3,346,033 | 10/1967 | Olejniczak | 159—4 S |
| 3,469,617 | 9/1969 | Palmason | 159—47 R |
| 2,127,026 | 8/1938 | Grindrod | 252—359 |
| 2,353,912 | 7/1944 | Lindsey | 261—79 |
| 2,554,138 | 5/1951 | Cross | 159—27 A |
| 2,593,503 | 4/1952 | Tomlinson et al. | 23—48 |
| 2,915,489 | 12/1959 | White | 260—33.6 |
| 2,980,661 | 4/1961 | Twaddle et al. | 260—93.5 |
| 3,064,619 | 11/1962 | Fortman | 116—137 |
| 3,123,305 | 3/1964 | Eisenkraft | 239—102 |
| 3,212,235 | 10/1965 | Markant | 55—238 X |
| 3,234,995 | 2/1966 | Berg et al. | 159—47 R |
| 3,275,063 | 9/1966 | Tailor | 159—4 B |

JACK SOFER, Primary Examiner

U.S. Cl. X.R.

252—359 D